May 3, 1927.
J. N. A. SAUER
1,627,343
PROCESS OF AND APPARATUS FOR TREATING LIQUIDS WITH
PURIFYING AND DECOLORIZING AGENTS
Filed May 25, 1923
4 Sheets-Sheet 1
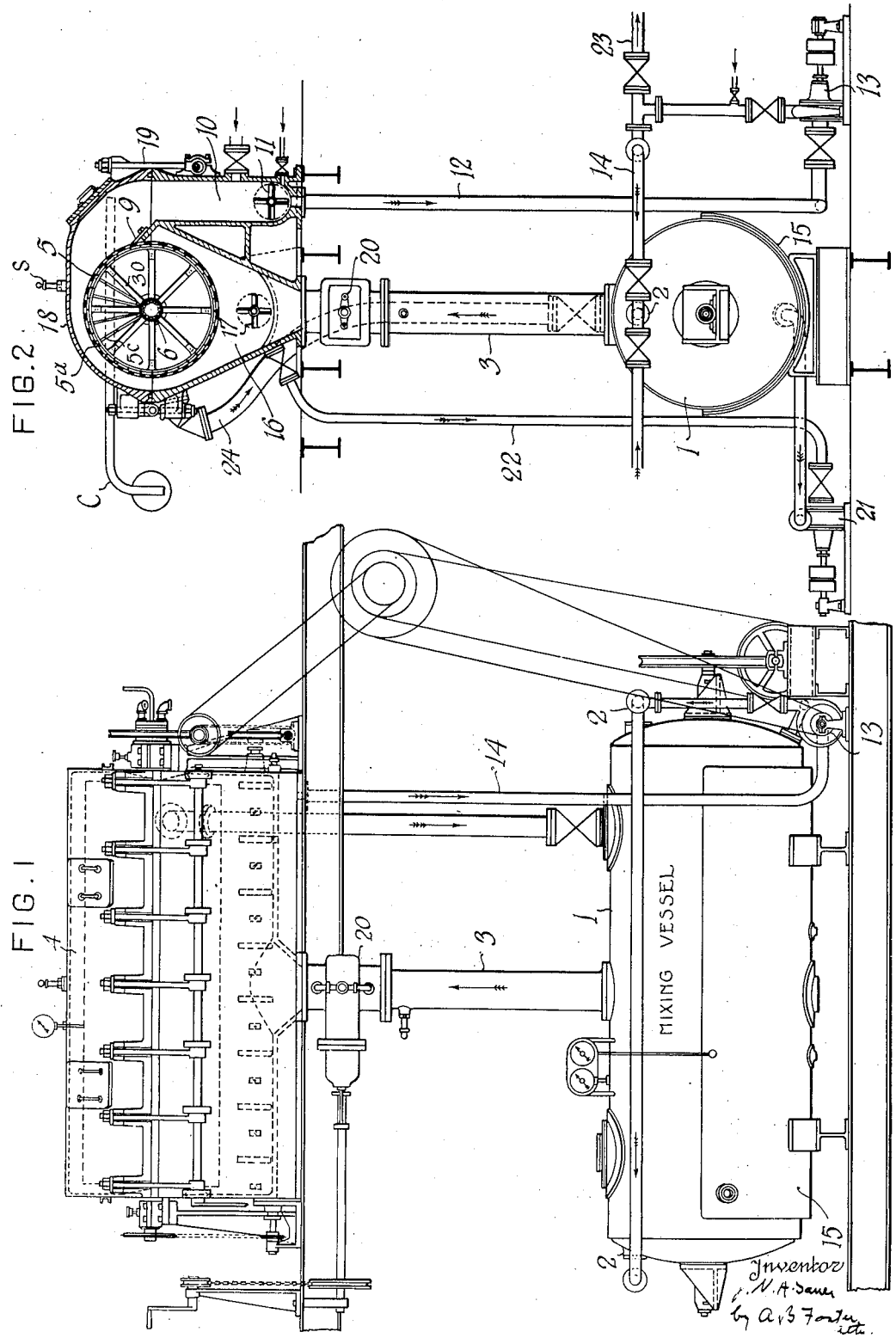

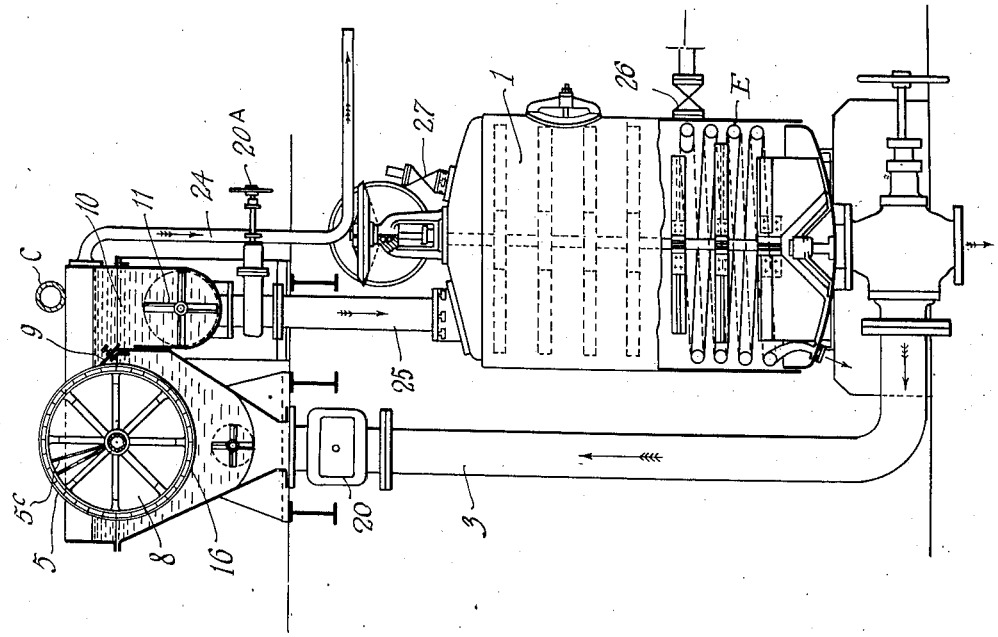
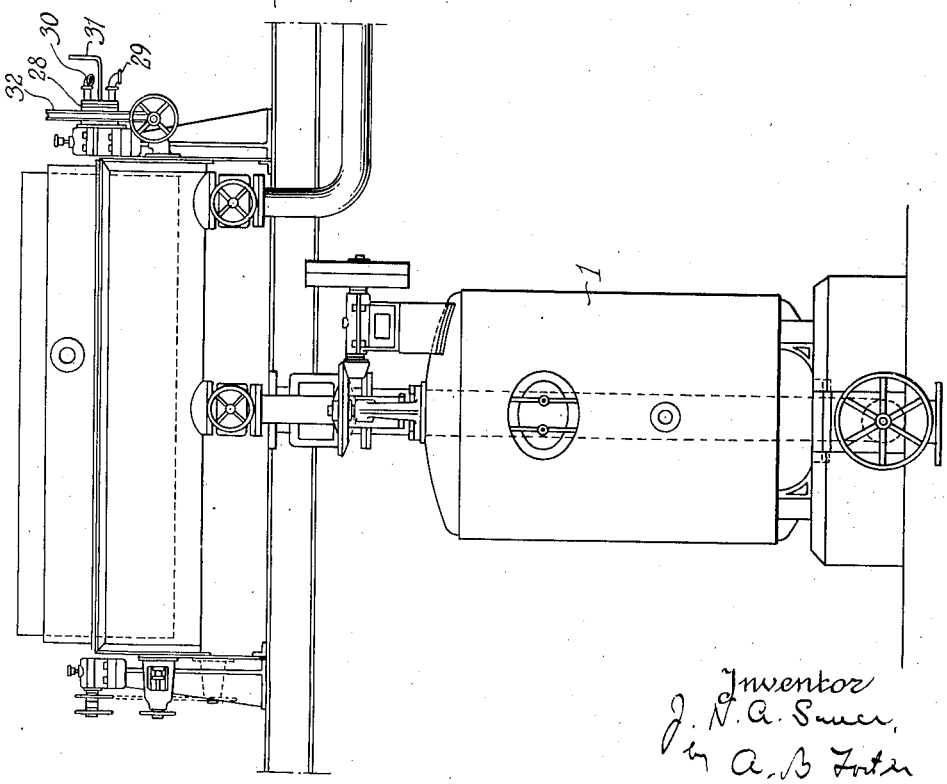

May 3, 1927.

J. N. A. SAUER

PROCESS OF AND APPARATUS FOR TREATING LIQUIDS WITH
PURIFYING AND DECOLORIZING AGENTS

Filed May 25, 1923  4 Sheets-Sheet 3

INVENTOR.
J. N. A. Sauer, by
A. B. Foster
atty.

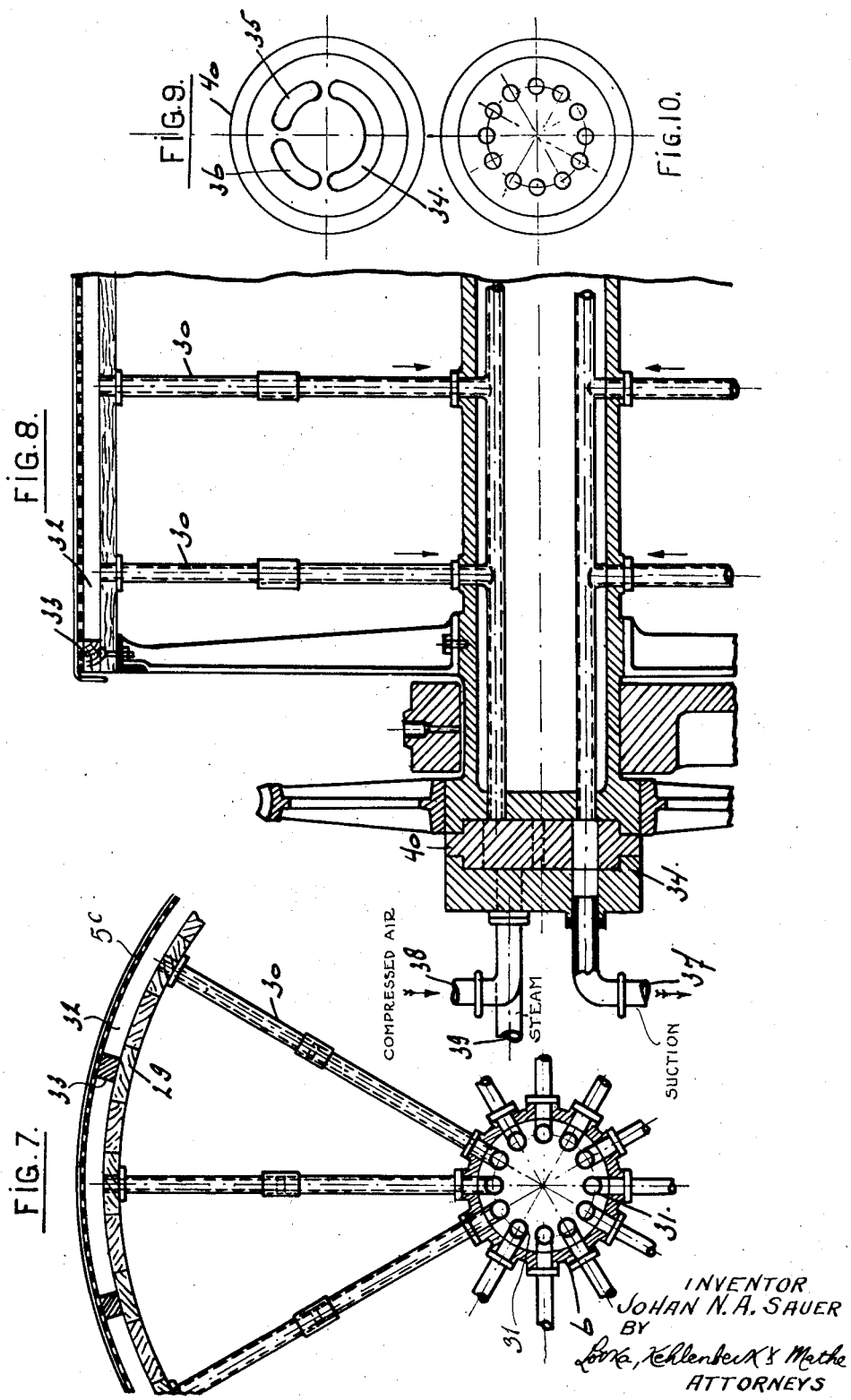

Patented May 3, 1927.

1,627,343

UNITED STATES PATENT OFFICE.

JOHAN NICOLAAS ADOLF SAUER, OF AMSTERDAM, NETHERLANDS.

PROCESS OF AND APPARATUS FOR TREATING LIQUIDS WITH PURIFYING AND DECOLORIZING AGENTS.

Application filed May 25, 1923, Serial No. 641,371, and in Germany May 26, 1922.

The invention is an improvement in, or modification of, the invention described and claimed in my U. S. applications Nos. 363366 and 512355. My said prior applications relate to a process of, and apparatus for, treating liquids with powdered decolorizing and purifying agents, for example finely powdered decolorizing carbon and like absorbents.

According to the invention claimed in the said application No. 363366 (now Patent 1,533,032) the liquid passes through a container or a series of containers, and is mixed in the course of its passage with an abundant quantity of the purifying agent, whereupon it flows through a filtering appliance, from whose surfaces the purifying agent retained is swept by a mechanical device, so that it drops back into the vessel from which the liquid has come. In the course of dropping back into this container the purifying agent encounters the liquid flowing to the filter, and the flow of this liquid may inconveniently impede the descent of the purifying agent, even to the extent of so obstructing it, so that an accumulation thereof in the filtering chamber occurs.

In my application No. 512355 I have described a method of overcoming this difficulty, namely the method of causing the purifying agent to return to the container by a path separate from that by which the liquid flows to the filter. In adopting this method the purifying agent may be mixed with liquid in the filter chamber, or outside the same, to form a liquid paste which flows to the container. The purifying agent may descend into a collecting chamber below the filter, and thence be conducted to the container into which the fresh liquid flows.

I have found that under certain circumstances there is some difficulty in properly detaching the purifying agent from the filter surface, especially if a fairly high filtering pressure is used, and if the difference of pressure in front of and behind the filter is fairly high, the detached purifying agent is liable to be sucked back to the filter.

The object of my present invention is to overcome this disadvantage.

I do this by so arranging means that while the scraper is in operation, or while the purifying agent separated by the filter is to be removed from the filter surface, that surface is relieved of pressure, or exposed to pressure in the opposite direction, or that the separated purifying agent is guided away from the filter in such a manner that it is withdrawn from the influence of the filtering pressure, and then returns to the place where it is mixed with the incoming fresh liquid.

By interrupting the filtering operation while the purifying agent is being removed from the filter, so that there is no opposing pressure on the caked mass, or by applying a counter pressure equal to, or exceeding, the filtering pressure, it is made possible that the caked mass can be detached from the filter without requiring excessive force, and injury to the filter surface is avoided.

This method may be adopted both in cases where pressure is applied to the liquid to force it through the filter, and in cases where there is atmospheric pressure in front of the filter, and a vacuum on the other side, for filtering by suction.

The separation of the caked mass from the filter may with advantage be effected by using, with a rotating filtering drum, a scraper which acts on a portion of the drum outside the liquid. The detached mass may be introduced into a stream of untreated liquid flowing to the main mixing container.

The invention is illustrated in the annexed drawings, which show by way of example three forms of apparatus for carrying the improved method into effect.

Fig. 1 is a side view, partly in section, and

Fig. 2 an end view, partly in section, of an apparatus in which pressure is applied, both during the filtering operation and during the separation of the purifying agent from the filter.

Figs. 3 and 4 are similar views of apparatus in which the liquid is treated under atmospheric pressure.

Fig. 7 is a cross section of part of a filtering drum for use with the improved method, and Fig. 8 is a longitudinal section of a portion of the said drum.

Fig. 9 is an end view of the fixed shaft of the drum, and

Figure 6:
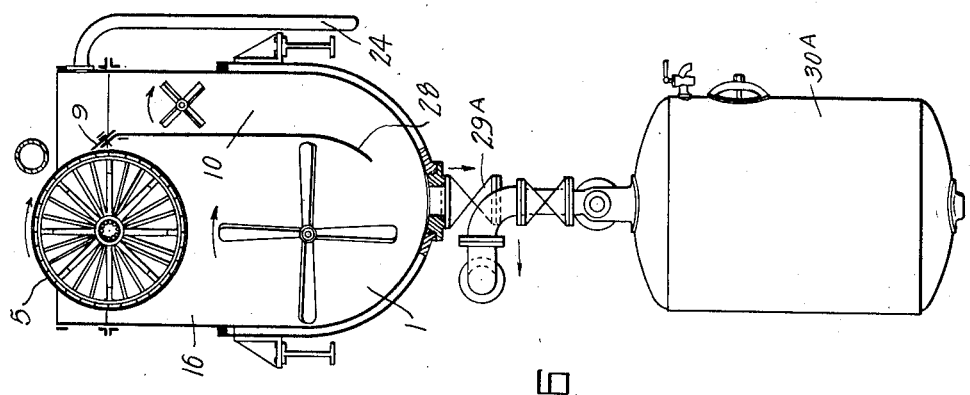
Figs. 5 and 6 are similar views of a somewhat more simple apparatus of the kind shown in Figs. 3 and 4.

Fig. 10 an elevation of a valve member used therewith.

In the drawings, 1 is the vessel or container in which the liquid and the purifying agent are mixed, the liquid being introduced at the inlets 2. The intimate mixture of liquid and purifier flows through the vertical conduit 3 to the filter chamber 4. The latter contains a drum 5, having a filtering jacket 5ª of cloth, or wire fabric, or both, arranged so that at predetermined intervals a portion of the inner side of the filtering surface is in communication with an outlet for filtered liquid, while another portion is in communication with a compressed air or steam inlet. For this purpose the cylinder may be divided by radial walls 5ᶜ into sectors, the hollow shaft being correspondingly divided up into chambers having inlets and outlets, and a distributing valve being used, whereby at intervals selected groups of the chambers are placed in communication alternately with the outlet for the liquid, and the compressed air or steam inlet.

As shown in Figs. 7 and 8 (see also Fig. 2) there may be provided a solid wooden drum 29 supported by (and spaced from) a hollow shaft 6. Upon the drum there are circumferential distance bars 33, over which is stretched the filter jacket (fabric, etc.) 5ᵉ. At intervals along the shaft there are radial tubes 30 communicating with longitudinal tubes 31 inside the shaft. These tubes serve alternately to conduct filtered liquid from the space 32 (see Fig. 7) inside the jacket, and to supply steam or compressed air to the said space. There is a fixed (i. e., non-rotatable) valve 40 (Fig. 9) having a port 34 in communication with a suction conduit 37, a port 35 communicating with a compressed air conduit 38, and a port 36 communicating with a steam conduit 39.

The steam or air pressure temporarily counteracts the filtering pressure and enables the purifying agent to be removed easily and completely from the filter surface.

Instead of having three groups, there may be two, either the steam pipe or the compressed air pipe being used as desired.

The caked purifying agent is removed from the filter cloth (see Fig. 2) by scrapers 9 and drops into a chamber 10 in which there is a mixer 11, producing a paste or sludge which is pumped out through a pipe 12 and forced by the centrifugal pump 13 through a pipe 14 to the inlets 2 of the container 1. The latter may have a hot water or steam jacket 15.

For maintaining the liquid and the purifier in continuous motion, and preventing settling of the purifier, there may be a vane wheel 17 in the space 16 below the filter.

When the purifying agent is spent it is removed in the following manner.

The filtering pressure is stopped and the cover 18 is lifted, the bolts 19 being unfastened for that purpose. A valve 20 is closed, in order to stop the flow of liquid sludge into the chamber 16 from conduit 3. By means of a pump 21 the mixture of liquid and spent purifying agent is then drawn from the chamber 16 through a pipe 22 and forced into a separator (not shown).

The supply of liquid to the filter chamber during running is so regulated that the liquid rises only to about the level of the shaft 6. There is an overflow at 24.

Water or other liquid vehicle may be introduced through pipe A into the chamber 11 into which the purifying agent drops from the filter and the spent agent may (at times) be forced by the pump 13 through a pipe 23 to a regenerating or revivifying apparatus.

The caked purifying agent on the part of the drum projecting out of the liquid may be washed or flushed off with water introduced for example through sprayer S.

In the modification shown in Figs. 3 and 4, working at atmospheric pressure, the chamber 16 containing the drum 5 and the chamber 10 receiving the agent scraped off the drum are separated from each other. These separated chambers can communicate with each other without needing any pumps. Consequently the liquid level is about the same in both these chambers. The connection between them is made by the pipe 25, mixing chamber 1, and conduit 3. The mixing cylinder 1 is upright in this form of construction. The apparatus works in the same way as that shown in Figs. 1 and 2 when the cover is lifted for the purpose of washing the cake off the filter drum. The difference in normal working is that the purifying agent drops off the drum into a body of liquid not yet heated. None of the filtered liquid goes back to the mixing vessel 1. The purifying agent circulates through the apparatus till it is spent, and no work is wasted in causing a portion of the filtered liquid to circulate with it.

The supply of fresh liquid may be effected by means of a perforated pipe as shown at C, or a weir extending along the top of chamber 10. In the latter there is a stirring appliance 11 over the mouth of the pipe 25, through which the liquid paste formed flows into the mixing cylinder 1, in which it is heated either by means of a heating jacket or heating coils E or the like, before flowing through the conduit 3 to the filter.

With this mode of operation the purifying agent and the liquid are kept in intimate contact with each other for a long time, comparatively speaking, and a uniform "suspension" is obtained. The purifying agent is used with uniform effect, till finally exhausted.

The action of the scraper 9 may be assisted by compressed air, or the removal of the caked mass from the filter surface may be effected by means of compressed air or steam alone.

When the purifying agent is spent the supply of liquid to the chamber 10 is stopped and the valve 20^A closed, so that the communication between the chambers 10 and 1 is interrupted. The liquid in the chamber 16 is kept up to the desired level by introducing compressed air through the valve 27 into the vessel 1.

Figure 5:
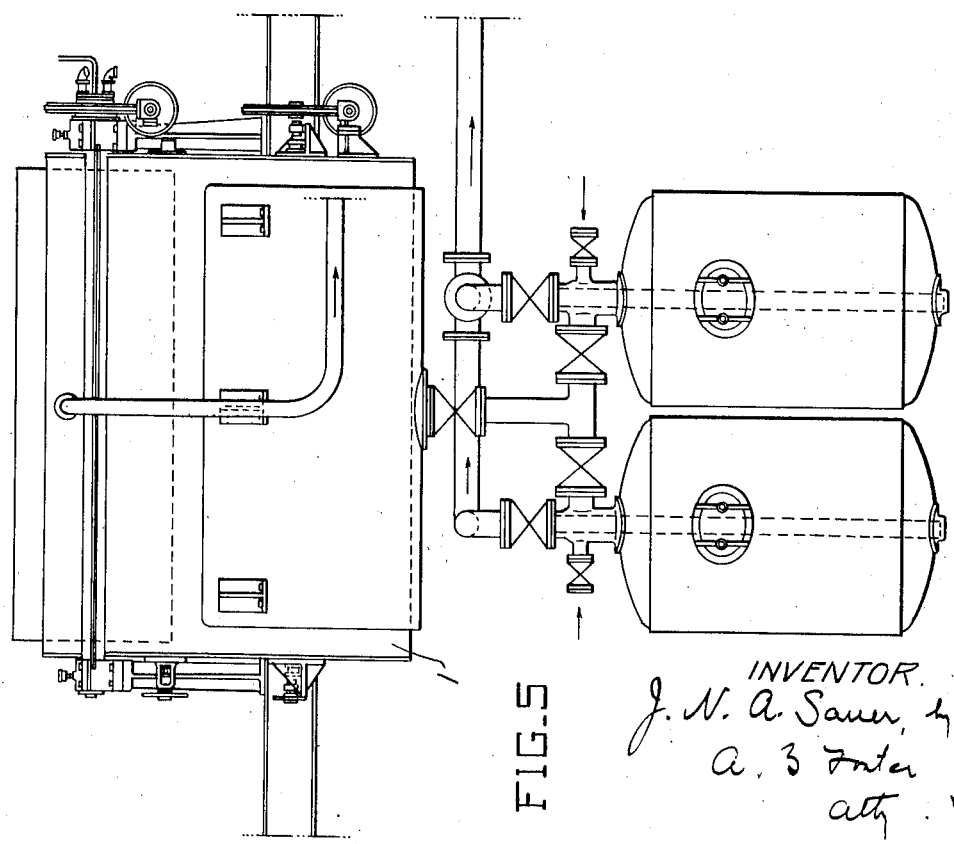

In the modification shown in Figs. 5 and 6 the mixing chamber 1 and filter chamber 16 are portions of a single vessel, and the chamber 10 is another portion of this vessel, divided off (through a part of its height) by a wall 28. The liquid to be treated is introduced at the top of chamber 10, or may be squirted on to the filter drum near the scraper 9 by perforated pipes F and G. The liquid, mixed with purifying agent from the filter, descends through the chamber 10 into the chamber 1, where it is acted on by a stirring device, and whence it ascends to the filter. When the purifying agent is spent, the liquid containing it may be diluted with water, and the agent can be washed in the filter itself, the liquid being then drawn off by means of a valve 29^A into a receptacle 30^A.

In some circumstances, especially if the liquid to be treated contains a large quantity of impurities, or colloids which tend to reduce the rate of filtration, it may be desirable to provide an appliance whereby a comparatively thin layer of fresh purifying agent is applied to the filtering surface, near the part where the caked mass is scraped off. This may be done, for example, by means of a sprayer arranged below the scraper. By applying a thin layer of fresh purifying agent in this way, risk of clogging of the filter by impurities is avoided.

It will be understood that the apparatus described and illustrated can be modified in various ways without departing from the principle of the invention.

What I claim is:

A process for purifying a liquid containing an absorbable impurity by means of a solid insoluble absorbent medium capable of being readily suspended in the liquid, which comprises agitating a bulk of the said liquid while carrying said solid in suspension and continuously separating the said solid from the purified liquid, preliminarily mixing such separated solid with a further amount of liquid to be purified in such proportions as to form a readily flowable fluid mass and continuously feeding such fluid mass to the said bulk of liquid under agitation, while such continuous separation step is being effected, said continuous separation of said liquid and solid being effected by a filtration in which the liquid to be filtered is maintained under a hydrostatic pressure substantially higher than the filtered liquid, thereby producing a positive pressure difference to force liquid through the filter from the face side of said filter, and effecting a reversal of the pressure difference during the operation of separating the said solid matter from the filter surface.

In testimony whereof I affix my signature.

JOHAN NICOLAAS ADOLF SAUER.